(12) United States Patent
Orihara

(10) Patent No.: US 10,275,058 B2
(45) Date of Patent: Apr. 30, 2019

(54) TOUCH PAD ANTENNA DEVICE AND ELECTRONIC APPARATUS

(71) Applicant: DEXERIALS CORPORATION, Tokyo (JP)

(72) Inventor: Katsuhisa Orihara, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 15/550,210

(22) PCT Filed: Feb. 5, 2016

(86) PCT No.: PCT/JP2016/053591
§ 371 (c)(1),
(2) Date: Aug. 10, 2017

(87) PCT Pub. No.: WO2016/129535
PCT Pub. Date: Aug. 18, 2016

(65) Prior Publication Data
US 2018/0032166 A1    Feb. 1, 2018

(30) Foreign Application Priority Data

Feb. 10, 2015   (JP) ................. 2015-024201

(51) Int. Cl.
*G06F 1/16* (2006.01)
*H01Q 1/22* (2006.01)
(Continued)

(52) U.S. Cl.
CPC .............. *G06F 3/041* (2013.01); *G06F 1/169* (2013.01); *G06F 3/0354* (2013.01);
(Continued)

(58) Field of Classification Search
CPC .......... G06F 1/169; G06F 3/041; G06F 3/044; G06F 3/03547; G06F 3/0354;
(Continued)

(56) References Cited

U.S. PATENT DOCUMENTS

| | | | |
|---|---|---|---|
| 2014/0335785 A1* | 11/2014 | Kato | H01Q 7/00 455/41.1 |
| 2015/0060555 A1* | 3/2015 | Murayama | G06K 19/07749 235/492 |
| 2015/0249282 A1 | 9/2015 | Orihara et al. | |

FOREIGN PATENT DOCUMENTS

| | | |
|---|---|---|
| JP | 4568436 B2 | 10/2010 |
| JP | 2011-004076 A | 1/2011 |

(Continued)

OTHER PUBLICATIONS

Mar. 1, 2016 International Search Report issued in Patent Application No. PCT/JP2016/053591.

*Primary Examiner* — Muhammad N Edun
(74) *Attorney, Agent, or Firm* — Oliff PLC

(57) ABSTRACT

A touch pad antenna device ensures communication performance while downsizing the antenna and while maintaining operation performance of a touch pad, and an electronic apparatus incorporating this touch pad antenna device. A touch pad antenna device provided along with a capacitance type touch pad mounted on an electronic apparatus and communicates with an external apparatus via an electromagnetic field signal, having an antenna coil inductively coupled to the external apparatus and arranged by winding around a conducting wire such that conducting wires opposing in width direction via an opening will be close to each other, wherein the antenna coil is arranged along outer edge of a sheet-like electrode section constituting the touch pad.

10 Claims, 14 Drawing Sheets

(51) Int. Cl.
  *H01Q 1/24* (2006.01)
  *H01Q 1/52* (2006.01)
  *H01Q 7/04* (2006.01)
  *H01Q 7/06* (2006.01)
  *G06F 3/041* (2006.01)
  *G06F 3/044* (2006.01)
  *G06F 3/0354* (2013.01)

(52) U.S. Cl.
  CPC .......... *G06F 3/03547* (2013.01); *G06F 3/044* (2013.01); *H01Q 1/2266* (2013.01); *H01Q 1/243* (2013.01); *H01Q 1/52* (2013.01); *H01Q 7/06* (2013.01); *H01Q 1/526* (2013.01); *H01Q 7/04* (2013.01)

(58) Field of Classification Search
  CPC ........ H01Q 1/243; H01Q 1/2266; H01Q 7/06; H01Q 1/526; H01Q 7/04; H01Q 1/52
  See application file for complete search history.

(56) References Cited

FOREIGN PATENT DOCUMENTS

| | | |
|---|---|---|
| JP | 5118666 B2 | 1/2013 |
| JP | 5378243 B2 | 12/2013 |
| WO | 2014/030662 A1 | 2/2014 |

\* cited by examiner

TOUCH PAD ANTENNA DEVICE AND ELECTRONIC APPARATUS

BACKGROUND OF THE INVENTION

Field of the Invention

The present invention relates to a touch pad antenna device integrating a capacitance type touch pad mounted on an electronic apparatus such as laptop computer and a RFID antenna, and an electronic apparatus incorporating this touch pad antenna device. The present application claims priority based on Japanese Patent Application Nos. 2015-024201 filed in Japan on Feb. 10, 2015, which is incorporated by reference herein.

Description of Related Art

Recently, a technology enabling communication between an electronic apparatus such as a laptop computer and an external apparatus such as a smartphone by mounting an antenna function such as RFID (Radio Frequency Identification) on the electronic apparatus has been developed. However, in a laptop computer being downsized and getting thinner, housing is often made of metal, and it blocks radio wave, so it was difficult to ensure communication performance of an antenna.

In patent literatures 1 to 3, an antenna integrated touch pad module enabling to communicate by providing an antenna to a touch pad arranged at an opening of a metal housing of a laptop computer was proposed. In such antenna integrated touch pad, radio wave will not be blocked by the opening where the touch pad is arranged, so it is possible to communicate with the external apparatus by arranging the antenna to be wound around the outer periphery of the touch pad. In addition, the antenna integrated touch pad module is having a structure that antenna pattern for communication is overlapped with X electrode layer, Y electrode layer and shield electrode layer forming a capacitance type touch pad.

Patent Literature 1: JP 4568436 B
Patent Literature 2: JP 5118666 B
Patent Literature 3: JP 5378243 B

SUMMARY OF THE INVENTION

However, when an antenna coil is configured in loop shape wound around an outer periphery of a touch pad, magnetic field of an antenna will be applied directly on an electrode section of the touch pad, and there was a risk that it causes malfunction or breakdown of the touch pad. In addition, as a dimension of an opening where the touch pad is arranged is small, NFC antenna, which can be mounted on the outer periphery of the touch pad, will be having a structure of extremely elongated approximately rectangular shape in a longitudinal direction. Therefore, currents flow through the antenna coil in opposite directions to each other in one side part and other side part, so in the elongated approximately rectangular shaped antenna coil in which the one side part and the other side part are arranged close to each other, magnetic field generated in each side part functions to cancel an induced current. As such, there was a problem that the current generated by the antenna coil will be decreased and the antenna performance will be deteriorated.

The present invention is invented considering the above problem, and the purpose of the present invention is to provide a new and improved touch pad antenna device ensuring communication performance while downsizing the antenna and while maintaining operation performance of a touch pad, and an electronic apparatus incorporating this touch pad antenna device.

One embodiment of the present invention is a touch pad antenna device provided along with a capacitance type touch pad mounted on an electronic apparatus and communicates with an external apparatus via an electromagnetic field signal, comprising an antenna coil inductively coupled to the external apparatus and arranged by winding around a conducting wire such that conducting wires opposing in width direction via an opening will be close to each other, wherein the antenna coil is arranged along outer edge of a sheet-like electrode section constituting the touch pad.

According to one embodiment of the present invention, it is possible to reduce magnetic field generated at the antenna coil while communicating with the external apparatus from reaching the touch pad, so it is possible to ensure communication performance of the antenna while maintaining operation performance of the touch pad.

At this time, in one embodiment of the present invention, the antenna coil may be divided into two, i.e. one side part in which conducting wires are wound around in one direction and other side part in which conducting wires are wound around in other direction, via a center line vertically sectioning the opening in a longitudinal direction, and the antenna coil may be configured such that the one side part is visible from the external apparatus and that the other side part is not visible from the external apparatus.

In this way, it is possible to reduce magnetic field generated at the antenna coil while communicating with the external apparatus from reaching the touch pad, so it is possible to ensure communication performance of the antenna, by using a magnetic shielding effect of the electrode section constituting the touch pad, while maintaining operation performance of the touch pad.

In addition, in one embodiment of the present invention, the antenna coil may be folded back at the center line such that the other side part is arranged at a surface opposite to a surface of the one side part opposing to the external apparatus, and also, the one side part may be configured to be arranged along the outer edge of the sheet-like electrode section.

In this way, it is possible to reduce magnetic field generated at the antenna coil while communicating with the external apparatus from reaching the touch pad, so it is possible to improve its communication performance while downsizing the antenna coil, and while maintaining operation performance of the touch pad.

In addition, in one embodiment of the present invention, the antenna coil may be configured such that the one side part is arranged along the outer edge of the sheet-like electrode section, and also, the other side part is overlapped with the sheet-like electrode section.

In this way, it is possible to ensure communication performance of the antenna by using the magnetic shielding effect of the sheet-like electrode section constituting the touch pad.

In addition, in one embodiment of the present invention, it may further comprise a magnetic sheet formed by magnetic substance and arranged to overlap with a part of the antenna coil at opposite side of a surface of the antenna coil opposing to the external apparatus.

In this way, it is possible to improve communication performance of the antenna by using the magnetic shielding effect of the electrode section constituting the touch pad, as magnetic flux from the external apparatus are collected and induced to the center part of the antenna coil by the magnetic sheet.

In addition, in one embodiment of the present invention, it may further comprise a conductive sheet overlapped with the antenna coil and the sheet-like electrode section.

In this way, it is possible to improve communication performance of the antenna by using a magnetic field shielding effect by the conductive sheet and the electrode section constituting the touch pad.

In addition, in other embodiment of the present invention, it is an electronic apparatus capable of communicating with the external apparatus via an electromagnetic field signal, wherein the touch pad antenna device described in any of the above is incorporated in the electronic apparatus.

In other embodiment of the present invention, the performance of the electronic apparatus mounting the touch pad is improved, as communication performance of the antenna is ensured while maintaining operation performance of the touch pad, by reducing the risk that magnetic field generated at the antenna coil while communicating with the external apparatus will reach the touch pad.

As explained above, in the present invention, it is possible to reduce magnetic field generated at the antenna coil while communicating with the external apparatus from reaching the touch pad, so it is possible to attain both maintenance of operation performance of the touch pad and ensurance of communication performance of the antenna.

DETAILED DESCRIPTION OF THE INVENTION

Hereinafter, explaining in detail about preferred embodiments of the present invention. In addition, the embodiments explained in below will not unjustly limit the content of the present invention described in claims, and it is not limited that all the structures explained in the embodiments are necessary as means for solving the problem of the present invention.

Figure 1:
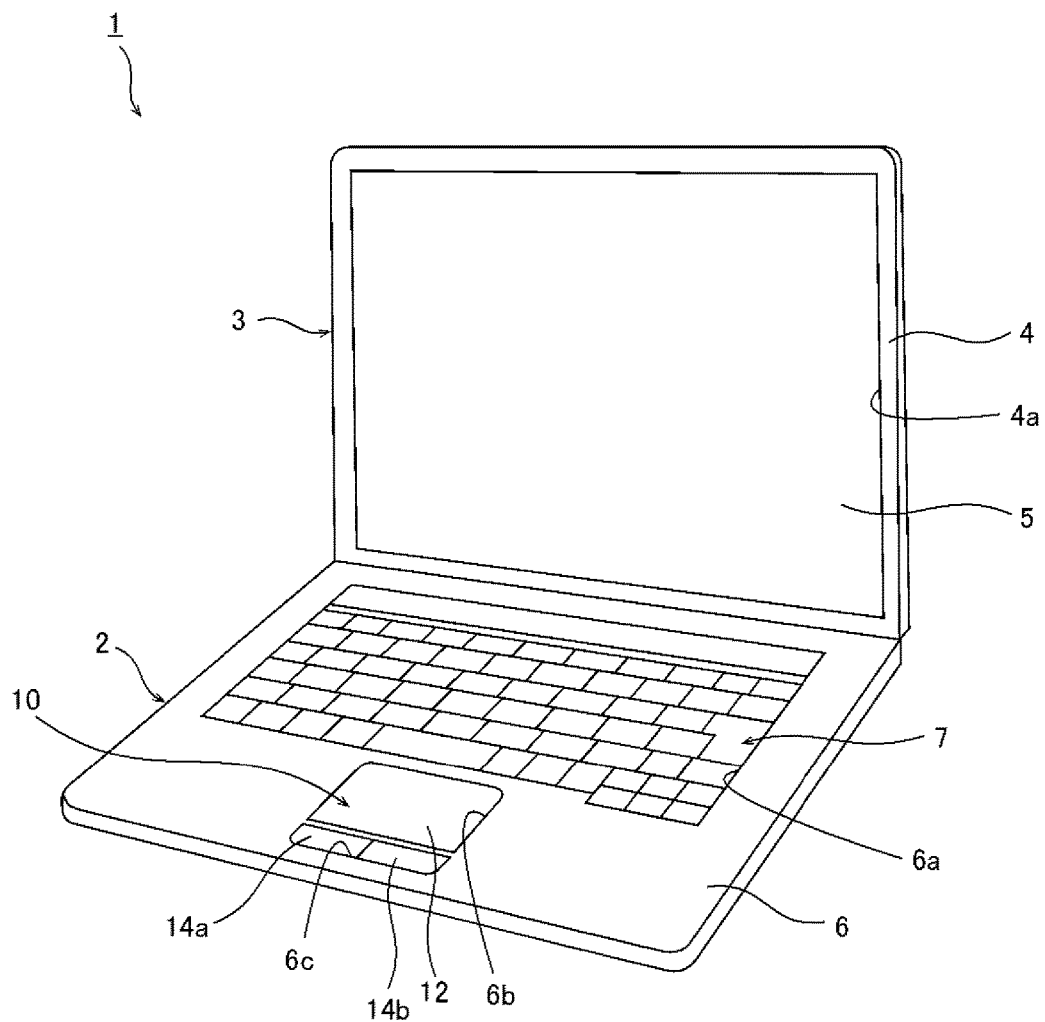
FIG. 1 is a perspective view illustrating an appearance of a personal computer mounting a touch pad antenna device relating to one embodiment of the present invention.

At first, explaining about a structure of a personal computer of one example of an electronic apparatus applying a touch pad antenna device relating to one embodiment of the present invention, by using drawings. FIG. 1 is a perspective view illustrating an appearance of a personal computer mounting a touch pad antenna device relating to one embodiment of the present invention.

A touch pad antenna device 100 (refer to FIG. 2) relating to one embodiment of the present invention is applied mainly to a laptop type personal computer 1 mounting a capacitance type touch pad 10 as an electronic device. The personal computer 1 comprises a main body 2 and a display 3, the main body 2 and the display 3 are connected via a hinge and else. The display 3 will be in a state that it is reversibly standing against the main body 2 (open state) by rotating with hinge as a supporting point, from a state that it is superposed on the main body 2 normally placed flatly (closed state).

For example, the display 3 comprises a display housing 4 made of resin. The display housing 4 is having a flat box shape, and for example, it is having a size approximately equal to A4 paper. The display housing 4 is having a surface (inner surface) opposing to the main body 2 when it is in the closed state, and in the inner surface of the display housing 4, an opening 4a is formed across approximately whole area. In the opening 4a of the display housing 4, for example, a liquid crystal panel 5 is presented.

The main body 2 comprises a main housing 6 having a flat box shape and made of resin. In an upper surface of the main housing 6 opposing to the display 3 when in the closed state, an opening 6a is arranged at hinge side, i.e. deep side, when seeing toward the liquid crystal panel 5, and a keyboard 7 is arranged in this opening 6a. In addition, a size of the upper surface of the main housing 6 is approximately equal to the inner surface of the display housing 4.

In addition, in the upper surface of the main housing 6, an opening 6b is formed at center in front of the keyboard 7. In this opening 6b, a face sheet 12 of a touch pad 10, which will be an input device with antenna, is presented. Further, in the upper surface of the main housing 6, an opening 6c is formed in front of the opening 6b, and in this opening 6c, two operation buttons 14a and 14b are presented aligning in width direction of the main housing 6.

Figure 2:
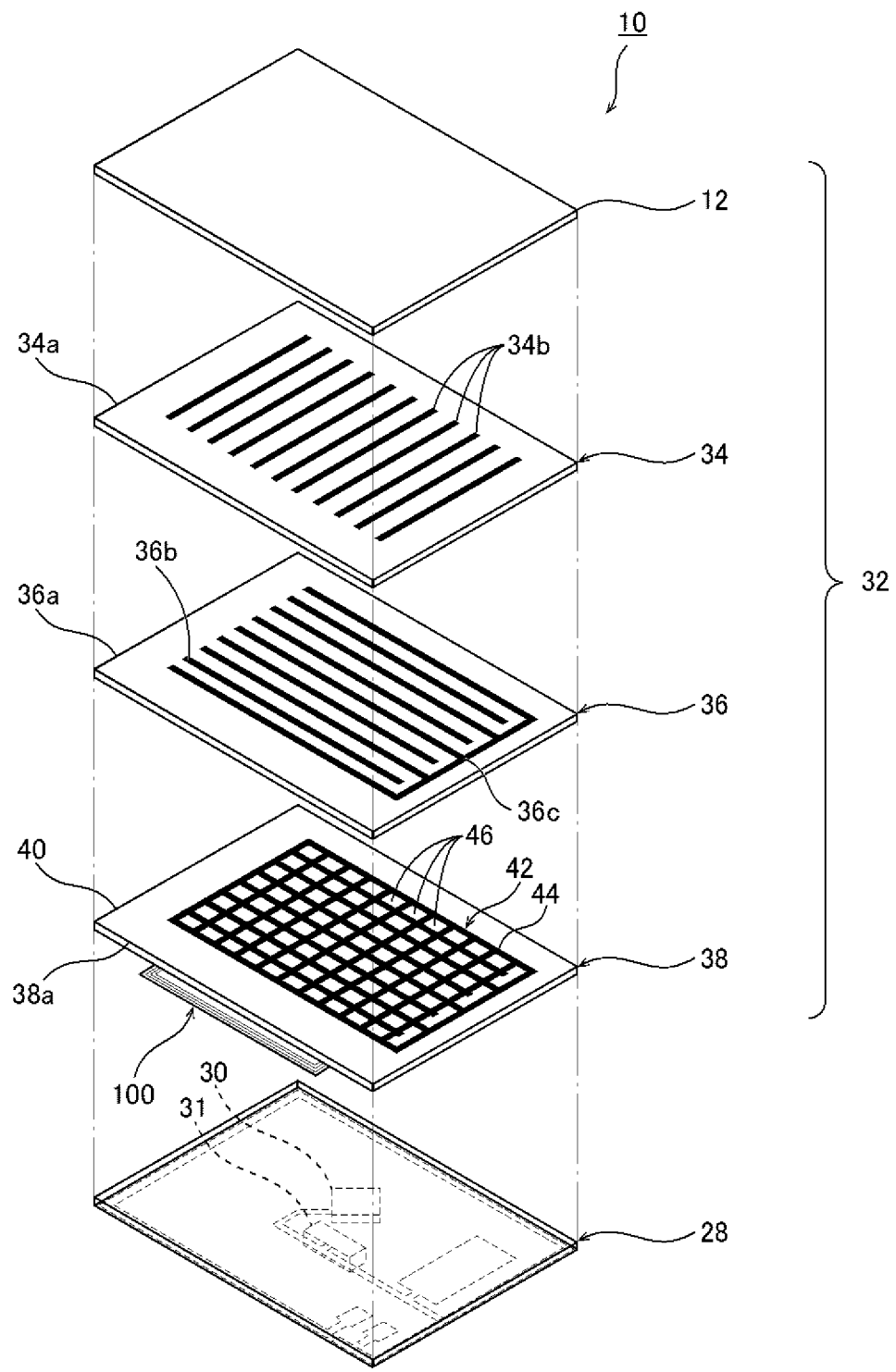
FIG. 2 is a schematic broken perspective view of the touch pad mounting the touch pad antenna device relating to one embodiment of the present invention.

Next, explaining about a structure of a touch pad mounting a touch pad antenna device relating to one embodiment of the present invention, by using drawings. FIG. 2 is a schematic broken perspective view of a touch pad mounting a touch pad antenna device relating to one embodiment of the present invention.

The touch pad 10 of this embodiment is an input device with a capacitance type antenna for performing position detection of user's finger or operation pen and else based on a change of capacitance, and it comprises a printed circuit board 28 having a wire with appropriate pattern (not illustrated). The printed circuit board 28 is arranged approximately in parallel with the upper surface of the main housing 6. In a lower surface of the printed circuit board 28, an electric element such as IC chip 30 and connector terminal 31 are mounted. The electric element mounted on the printed circuit board 28 is connected to a mother board (not illustrated) of the personal computer 1 via the connector terminal 31 and a flat cable and else connected to the connector terminal 31.

In the upper surface of the printed circuit board 28 located at the opening 6b side, a laminated body 32 including a face sheet 12 is fixed. The upper surface of the face sheet 12 is composed as a sensing surface, and the user inputs a desired command to the personal computer 1 via the input device 10 with antenna by contacting or approaching user's finger or object for input to the sensing surface. In addition, the printed circuit board 28 is having a square shape equivalent to the laminated body 32, and the laminated body 32 is fixed to one surface of the printed circuit board 28.

The laminated body 32 comprises X electrode layer 34, Y electrode layer 36, and shield electrode layer 38 in order from the face sheet 12 side. These face sheet 12, X electrode layer 34, Y electrode layer 36, and shield electrode layer 38 are closely bonded to each other by hot pressing or adhesive.

The X electrode layer 34 comprises a film substrate (X electrode substrate) 34a and a plurality of X electrodes 34b formed integrally with the film substrate 34a. The X electrodes 34b are distributed in approximately whole area of one surface of the film substrate 34a. Concretely, the film substrate 34a is having a rectangular shape, and short sides of the film substrate 34a extend in depth direction of the main body 2 of the personal computer 1, and long sides of the film substrate 34a extend in width direction of the main body 2 of the personal computer 1.

In addition, the X electrodes 34b are constituted by a plurality of conductive strips being parallel to each other, and the conductive strips extend respectively in short side direction of the film substrate 34a, and separated at certain spacing to each other in long side direction of the film substrate 34a.

On the other hand, the Y electrode layer 36 comprises a film substrate (Y electrode substrate) 36a and a plurality of Y electrodes 36b formed integrally with the film substrate 36a. In addition, the Y electrode layer 36 comprises a detection electrode 36c in comb shape formed integrally with the film substrate 36a. The Y electrodes 36b and the detection electrode 36c are distributed in approximately whole area of one surface of the film substrate 36a while arranged to engage with each other. Concretely, the film substrate 36a is having a rectangular shape as same as the film substrate 34a. The Y electrodes 36b are constituted by a plurality of conductive strips being parallel to each other, and the conductive strips extend respectively in long side direction of the film substrate 36a, and separated at certain spacing to each other in short side direction of the film substrate 36a.

The detection electrode 36c is constituted by a plurality of conductive strips being parallel to each other and one conductive strip connecting one end of these strips to each other. The plurality of conductive strips of the detection electrode 36c also extend respectively in long side direction of the film substrate 36a, and separated at certain spacing to each other in short side direction of the film substrate 36a, as well as the plurality of conductive strips of the Y electrodes 36b. And, the plurality of conductive strips of the detection electrode 36c are arranged between the plurality of conductive strips of the Y electrodes 36b.

Therefore, the Y electrodes 36b and the X electrodes 34b are being orthogonal to each other in grid shape when viewed from a laminating direction. And, the detection electrode 36c, the Y electrodes 36b, and the X electrodes 34b respectively constitute a measuring electrode for detecting a position of an object such as fingertip contacting or approaching a surface of the face sheet 12.

The shield electrode layer 38 is a sheet-like electrode section comprising a film substrate 40, which will be a shield electrode substrate, and a shield electrode 42 formed integrally with the film substrate 40. The shield electrode 42 comprises a layered main body 44 consists of conductive material, and preferably, a plurality of openings 46 are formed in the main body 44. The main body 44 is located in a projection position for projecting the X electrodes 34b, the Y electrodes 36b, and the detection electrode 36c, in laminated direction of the X electrode layer 34, the Y electrode layer 36, and the shield electrode layer 38.

The openings 46 are located in non-projection position where the X electrodes 34b, the Y electrodes 36b, and the detection electrode 36c are not projected in laminated direction. Therefore, the main body 44 of the shield electrode 42 is having a grid shape such that the X electrodes 34b, the Y electrodes 36b, and the detection electrode 36c are overlapped. In addition, a shape of the shield electrode 42 is not limited to the grid shape, and it may be a solid shape.

In addition, the film substrates 34a, 36a and 40 and face sheet 12 are having approximately same shape, and aligned at four corners to be overlapped to each other. And, the film substrates 34a, 36a and 40 and the printed circuit board 28 are integrally joined, and configuring one insulating substrate having multi-layered structure. The face sheet 12 is protecting a film substrate 34a located at a top of the insulating substrate, and the face sheet 12 may be integrated with or separated with the insulating substrate.

In this embodiment, a touch pad antenna device 100 communicating with the external apparatus such as smart phone via an electromagnetic field signal is provided along with the touch pad 10. The touch pad antenna device 100 is configured to integrate the touch pad 10 and a RFID antenna.

In addition, in this embodiment, it is characterized in that the touch pad antenna device 100 is arranged along an outer edge 38a of the shield electrode layer 38, which is a sheet-like electrode section constituting the touch pad 10

First Embodiment

Figure 3A:
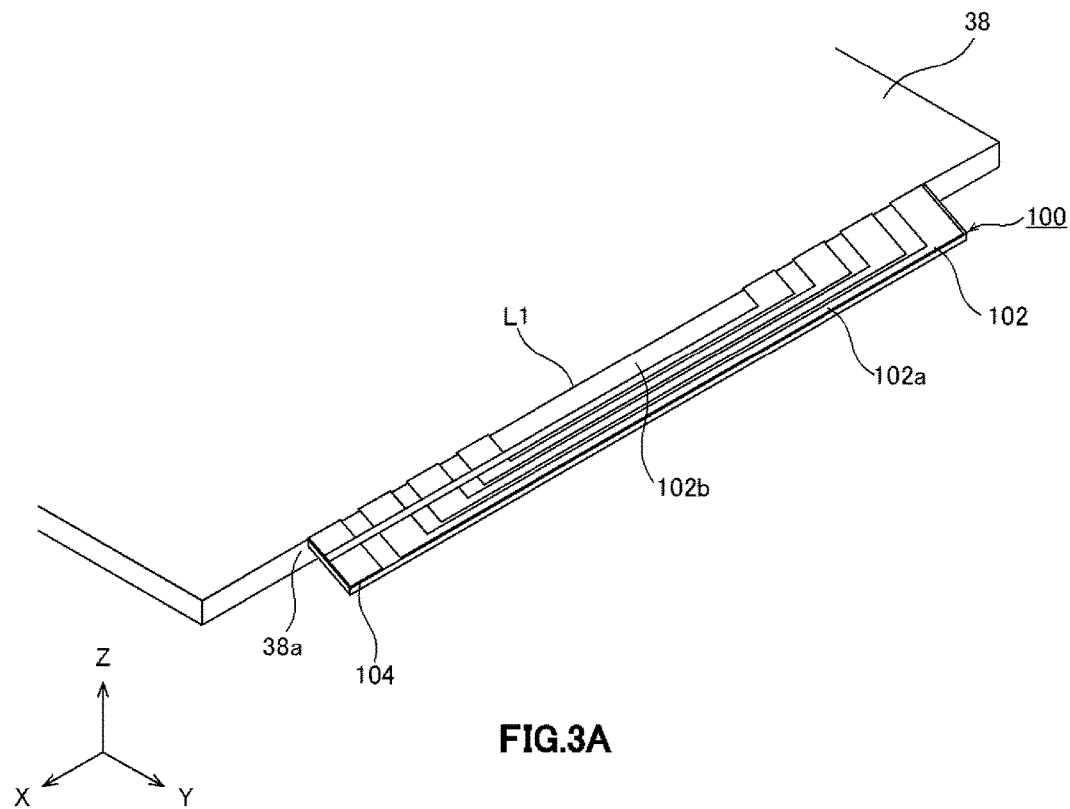
FIG. 3A is a perspective view illustrating a schematic structure of the touch pad antenna device relating to first embodiment of the present invention.

Next, explaining about a structure of a touch pad antenna device relating to first embodiment of the present invention, by using drawings. FIG. 3A is a perspective view illustrating a schematic structure of the touch pad antenna device relating to first embodiment of the present invention, and FIG. 3B is a side view illustrating a schematic structure of the touch pad antenna device relating to first embodiment of the present invention.

Figure 3B:
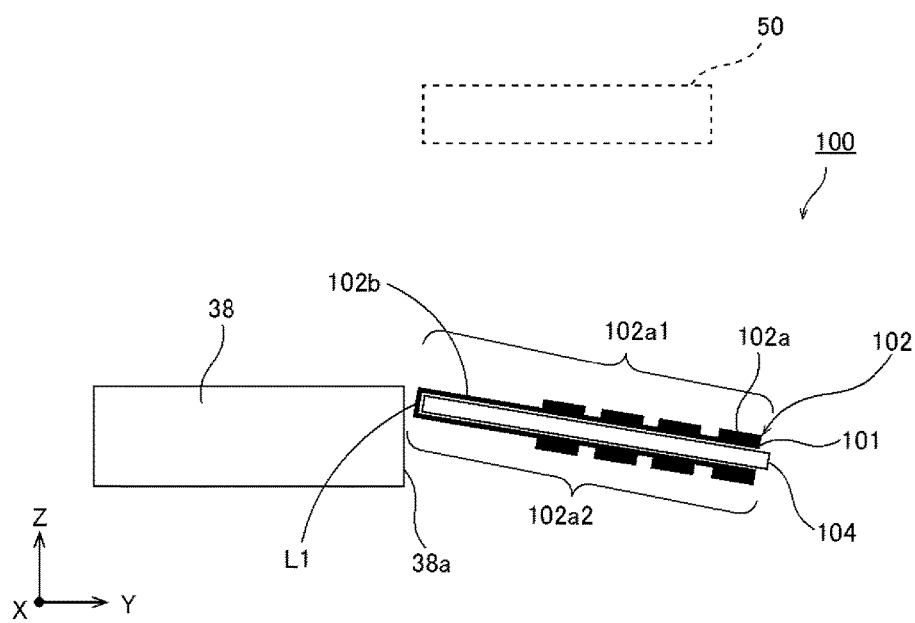
FIG. 3B is a side view illustrating a schematic structure of the touch pad antenna device relating to first embodiment of the present invention.

As illustrated in FIG. 3A, the touch pad antenna device 100 comprises an antenna coil 102 arranged by winding around a conducting wire 102a such that conducting wires 102a opposing to each other in width direction via its opening 102b will be close to each other, and inductively coupled to an external apparatus 50 (refer to FIG. 3B). The antenna coil 102 is formed by patterning treatment of flexible conducting wire 102a all over an antenna substrate 101 composed of an elastic flexible substrate.

In this embodiment, the antenna coil 102 is configured to be arranged such that the conducting wire 102a is wound around in an elongated approximately rectangular shape in a longitudinal direction for mounting the antenna coil 102 in a limited narrow space of the opening 6b arranged on upper surface of the main housing 6 of the electronic apparatus 1, for mounting the touch pad 10 (refer to FIG. 2). In addition, the antenna coil 102 is arranged along the outer edge 38a of the sheet-like electrode section 38 constituting the touch pad 10 for reducing a risk of malfunction and else by weakening magnetic field strength on the touch pad 10. In other words, in this embodiment, the antenna coil 102 is configured to be wound around in an elongated approximately rectangular shape in a longitudinal direction, and also, to be arranged along the outer edge 38a of the sheet-like electrode section 38, for preventing malfunction of the touch pad 10 while mounting the antenna coil 102 in a limited narrow space of the opening 6b arranged on upper surface of the main housing 6 of the electronic apparatus 1.

The antenna coil 102 is divided into two, i.e. one side part 102a1 in which conducting wires 102a are wound around in one direction and other side part 102a2 in which conducting wires 102a are wound around in other direction, via a center line L1 vertically sectioning the opening 102b in a longitudinal direction. And, as illustrated in FIG. 3B, the antenna coil 102 is configured such that the one side part 102a1 is visible from the external apparatus 50 and that the other side part 102a2 is not visible from the external apparatus 50.

Concretely, the antenna coil 102 is configured such that the other side part 102a2 is arranged at back side of the one side part 102a1 by folding back at the center line L1, such that the other side part 102a2 is arranged at a surface opposite to a surface of the one side part 102a1 opposing to the external apparatus 50. And, the antenna coil 102 is configured such that the one side part 102a1 is arranged along the outer edge 38a of the sheet-like electrode section 38.

In addition, in this embodiment, a magnetic sheet 104 formed by magnetic substance is arranged such that the magnetic sheet 104 is sandwiched between the one side part 102a1 and the other side part 102a2 of the antenna coil 102. In other words, the magnetic sheet 104 is arranged to overlap with a part of the antenna coil 102 at opposite side of a surface of the antenna coil 102 opposing to the external apparatus 50. By arranging the magnetic sheet 104, it is possible to improve a communication property of the antenna by collecting and inducing magnetic flux from the external apparatus 50 to a center side of the antenna coil 102.

In this way, in this embodiment, the antenna coil 102 is arranged along the outer edge 38a of the sheet-like electrode section 38 of the touch pad 10 by folding back the antenna coil 102, which is configured by winding around the conducting wire 102a in elongated approximately rectangular shape, in half along the center line L1 extending in a longitudinal direction. In this way, by arranging the antenna coil 102 being folded back in half along the outer edge 38a of the sheet-like electrode section 38, it is possible to weaken magnetic field strength on the touch pad 10 by reducing magnetic field generated at the antenna coil 102 while communicating with the external apparatus 50 from reaching the touch pad 10.

Therefore, it is possible to inhibit a malfunction of the touch pad 10 occurred by the magnetic field generated at the antenna coil 102 reaching the touch pad 10, so it is possible to ensure communication performance of NFC antenna using a magnetic shielding effect of the sheet-like electrode section 38 of the touch pad 10, while maintaining operation performance of the touch pad 10. In other words, it is possible to achieve NFC antenna with good communication efficiency, even the antenna coil 102 is formed in the elongated shape, by using the magnetic shielding effect of the sheet-like electrode section 38, which will be a sensing electrode to which electrode pattern of the touch pad 10 will be formed. The touch pad 10 is used by incorporating it in a portable apparatus such as PC.

Especially, even when the antenna coil 102 is configured such that the conducting wire 102a is wound around in elongated approximately rectangular shape in longitudinal direction, good communication property can be obtained by reducing a deterioration of communication performance of the antenna by mutual cancelling out of induced voltages of the one side part 102a1 and the other side part 102a2 of the antenna coil 102, by using the magnetic shielding effect by the sheet-like electrode section 38 of the touch pad 10. In other word, it is possible to improve communication performance of the antenna, while downsizing the antenna coil 102, and while maintaining operation performance of the touch pad 10.

Figure 4:
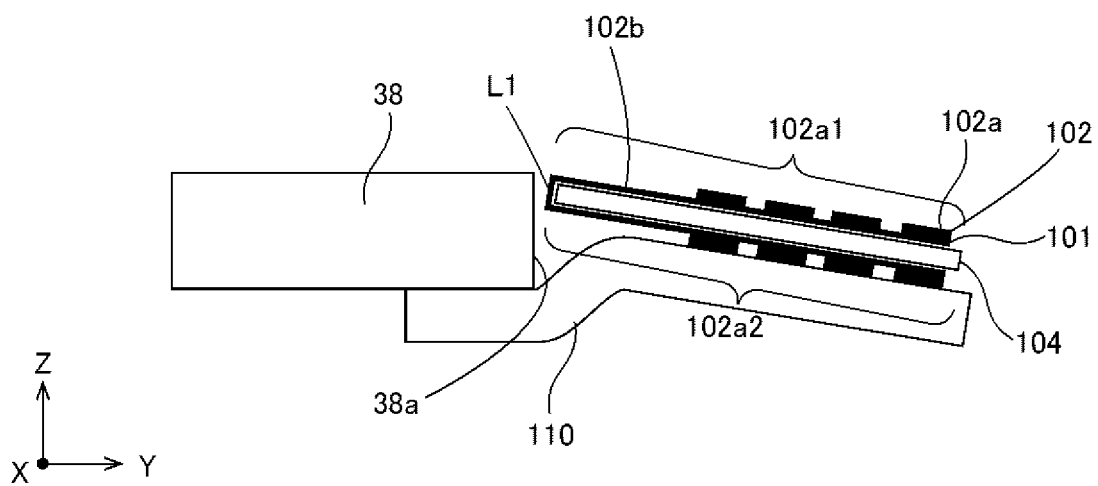
FIG. 4 is a perspective view illustrating a modified example of the touch pad antenna device relating to first embodiment of the present invention.

In addition, in this embodiment, as illustrated in FIG. 4, a communication property of NFC antenna may be improved by further arranging the conductive sheet 110 consisting of copper, aluminum and else, such that the conductive sheet 110 will be overlapped with both of the antenna coil 102 and the sheet-like electrode section 38. By arranging the conductive sheet 110, it is possible to improve a communication property of the antenna, by using a magnetic field shielding effect by the conductive sheet 110 and a sheet-like electrode section 38 composing the touch pad 10.

Second Embodiment

Figure 5A:
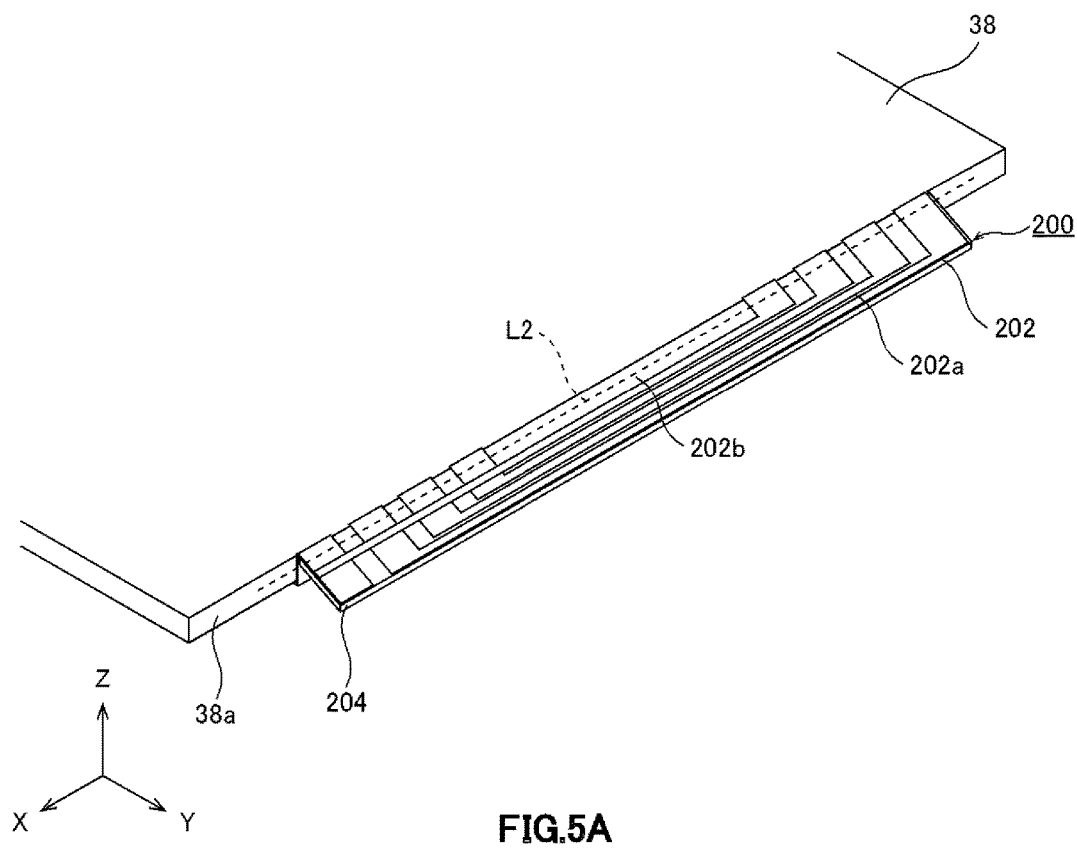
FIG. 5A is a perspective view illustrating a schematic structure of the touch pad antenna device relating to second embodiment of the present invention.
Figure 5B:
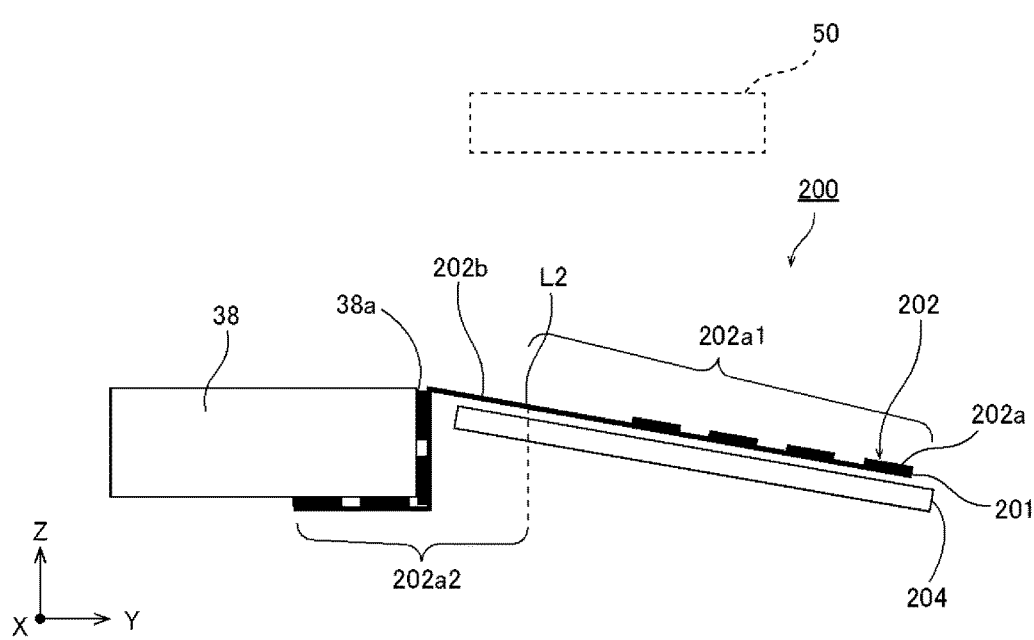
FIG. 5B is a side view illustrating a schematic structure of the antenna device relating to second embodiment of the present invention.

Next, explaining about the structure of a touch pad antenna device relating to second embodiment of the present invention, using drawings. FIG. 5A is a perspective view illustrating a schematic structure of the touch pad antenna device relating to second embodiment of the present invention, and FIG. 5B is a side view illustrating a schematic structure of the antenna device relating to second embodiment of the present invention.

As illustrated in FIG. 5A, a touch pad antenna device 200 comprises an antenna coil 202 conductively coupled to an external apparatus 50 (refer to FIG. 5B), and arranged by winding around a conducting wire 202a such that conducting wires 202a opposing in width direction via its opening 202b will be close to each other. The antenna coil 202 is formed by patterning treatment of flexible conducting wire 202a all over an antenna substrate 201 composed of an elastic flexible substrate.

In this embodiment, the antenna coil 202 is configured to be arranged such that the conducting wire 202a is wound around in an elongated approximately rectangular shape in a longitudinal direction for mounting the antenna coil 202 in a limited narrow space of the opening 6b arranged on upper surface of the main housing 6 of the electronic apparatus 1, for mounting the touch pad 10 (refer to FIG. 2). In addition, the antenna coil 202 is arranged along the outer edge 38a of the sheet-like electrode section 38 constituting the touch pad 10 for reducing a risk of malfunction and else by weakening magnetic field strength on the touch pad 10. In other words, in this embodiment, the antenna coil 202 is configured to be wound around in an elongated approximately rectangular shape in a longitudinal direction, and also, to be arranged along the outer edge 38a of the sheet-like electrode section 38, for preventing malfunction of the touch pad 10 while mounting the antenna coil 202 in a limited narrow space of the opening 6b arranged on upper surface of the main housing 6 of the electronic apparatus 1.

The antenna coil 202 is divided into two, i.e. one side part 202a1 in which conducting wires 202a are wound around in one direction and other side part 202a2 in which conducting wires 202a are wound around in other direction, via a center line L2 vertically sectioning the opening 202b in a longitudinal direction. And, as illustrated in FIG. 5B, the antenna coil 202 is configured such that the one side part 202a1 is visible from the external apparatus 50 and that the other side part 202a2 is not visible from the external apparatus 50. Concretely, the antenna coil 202 is configured such that the one side part 202a1 is arranged along the outer edge 38a of the sheet-like electrode section 38, and also, the other side part 202a2 is overlapped at back surface side of the sheet-like electrode section 38.

In addition, in this embodiment, a magnetic sheet 204 formed by magnetic substance is arranged under the one side part 202a1. In other words, the magnetic sheet 204 is arranged to overlap with at least a part of the antenna coil 202 at opposite side of a surface of the antenna coil 202 opposing to the external apparatus 50. By arranging the magnetic sheet 204, it is possible to improve a communication property of the antenna by collecting and inducing magnetic flux from the external apparatus 50 to a center side of the antenna coil 202.

In this way, in this embodiment, the other side part 202a2 of the antenna coil 202 configured such that the conducting wire 202a is wound around in elongated approximately rectangular shape is overlapped at backside of the sheet-like electrode section 38, and also, the one side part 202a1 of the antenna coil 202 is arranged along the outer edge 38a of the sheet-like electrode section 38 of the touch pad 10. In this way, by arranging the one side part 202a1 of the antenna coil 202 along the outer edge 38a of the sheet-like electrode section 38, and also, by arranging the other side part 202a2 of the antenna coil 202 to be overlapped at back side of the sheet-like electrode section 38, it is possible to weaken magnetic field strength on the touch pad 10 by reducing the magnetic field generated at the antenna coil 202 while communicating with the external apparatus 50 from reaching the touch pad 10.

Therefore, it is possible to inhibit a malfunction of the touch pad 10 occurred by the magnetic field generated at the antenna coil 202 reaching the touch pad 10, so it is possible to ensure communication performance of NFC antenna using the magnetic shielding effect of the sheet-like electrode section 38 of the touch pad 10, while maintaining operation performance of the touch pad 10. In other words, it is possible to achieve NFC antenna with good communication efficiency, even the antenna coil 202 is formed in the elongated shape, by using the magnetic shielding effect of the sheet-like electrode section 38, which will be a sensing electrode to which electrode pattern of the touch pad 10 will be formed. The touch pad 10 is used by incorporating it in a portable apparatus such as PC.

Especially, even when the antenna coil 202 is configured such that the conducting wire 202a is wound around in elongated approximately rectangular shape in longitudinal direction, good communication property can be obtained by reducing a deterioration of communication performance of the antenna by mutual cancelling out of induced voltages of the one side part 202a1 and the other side part 202a2 of the antenna coil 202, by using the magnetic shielding effect by the sheet-like electrode section 38 of the touch pad 10. In other word, it is possible to improve communication performance of the antenna, while downsizing the antenna coil 202, and while maintaining operation performance of the touch pad 10.

Figure 6:
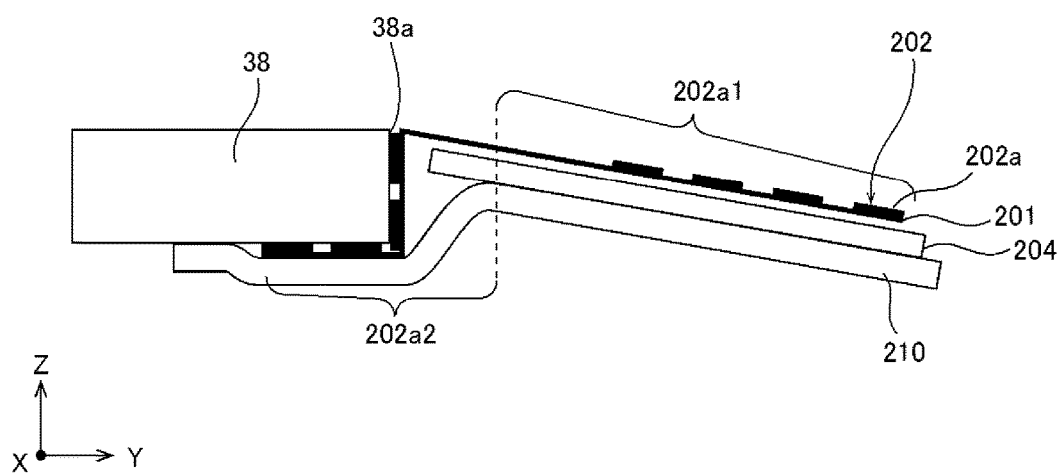
FIG. 6 is a side view illustrating a modified example of the touch pad antenna device relating to second embodiment of the present invention.

In addition, in this embodiment, as illustrated in FIG. 6, a communication property of NFC antenna may be improved by further arranging the conductive sheet 210 consisting of copper, aluminum and else, such that the conductive sheet 210 will be overlapped to both of the antenna coil 202 and the sheet-like electrode section 38. By arranging the conductive sheet 210, it is possible to improve a communication property of the antenna, by using a magnetic field shielding effect by the conductive sheet 210 and a sheet-like electrode section 38 composing the touch pad 10.

Third Embodiment

Figure 7A:
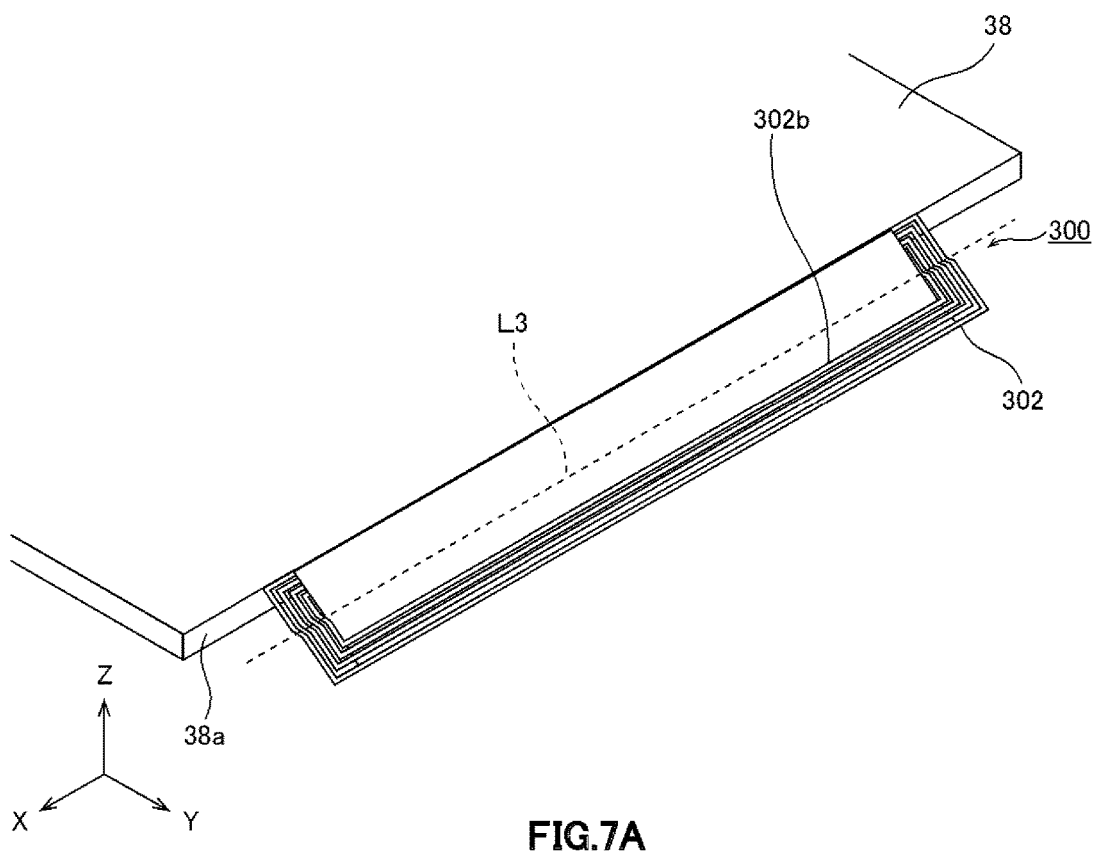
FIG. 7A is a perspective view illustrating a schematic structure of the touch pad antenna device relating to third embodiment of the present invention.
Figure 7B:
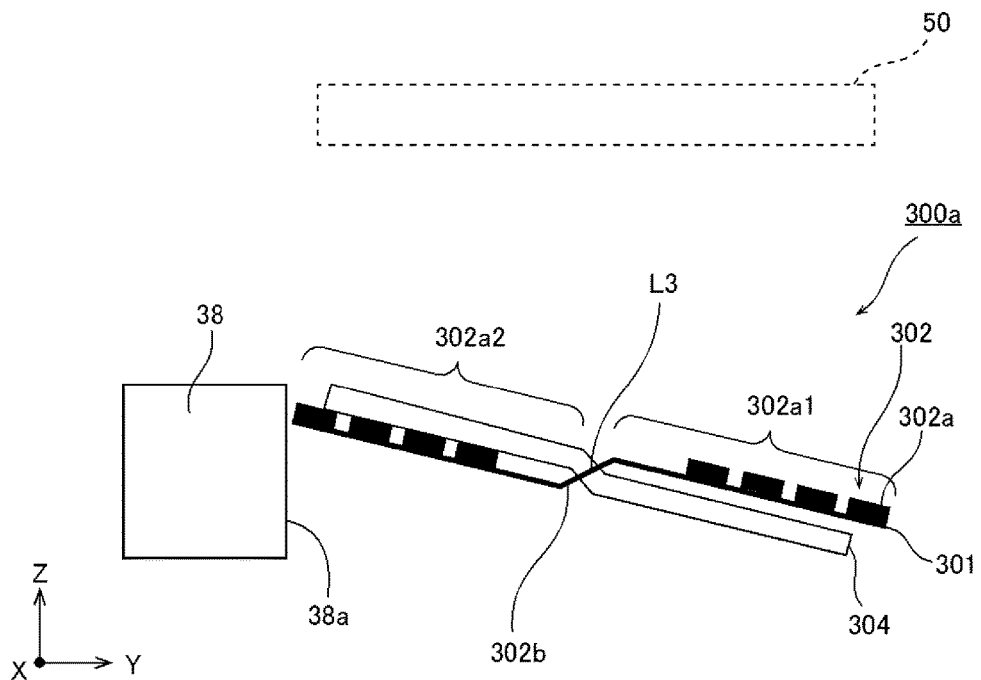
FIG. 7B is a side view illustrating a schematic structure of the antenna device relating to third embodiment of the present invention.

Next, explaining about the structure of a touch pad antenna device relating to third embodiment of the present invention, using drawings. FIG. 7A is a perspective view illustrating a schematic structure of the touch pad antenna device relating to third embodiment of the present invention, and FIG. 7B is a side view illustrating a schematic structure of the antenna device relating to third embodiment of the present invention.

As illustrated in FIG. 7A, a touch pad antenna device 300 comprises an antenna coil 302 conductively coupled to an external apparatus 50 (refer to FIG. 7B), and arranged by winding around a conducting wire 302a such that conducting wires 302a opposing in width direction via its opening 302b will be close to each other. The antenna coil 302 is formed by patterning treatment of flexible conducting wire 302a all over an antenna substrate 301 composed of an elastic flexible substrate.

In this embodiment, the antenna coil 302 is configured to be arranged such that the conducting wire 302a is wound around in an elongated approximately rectangular shape in a longitudinal direction for mounting the antenna coil 302 in a limited narrow space of the opening 6b arranged on upper surface of the main housing 6 of the electronic apparatus 1, for mounting the touch pad 10 (refer to FIG. 2). In addition, the antenna coil 302 is arranged along the outer edge 38a of the sheet-like electrode section 38 constituting the touch pad 10 for reducing a risk of malfunction and else by weakening magnetic field strength on the touch pad 10. In other words, in this embodiment, the antenna coil 302 is configured to be wound around in an elongated approximately rectangular shape in a longitudinal direction, and also, to be arranged along the outer edge 38a of the sheet-like electrode section 38, for preventing malfunction of the touch pad 10 while mounting the antenna coil 302 in a limited narrow space of the opening 6b arranged on upper surface of the main housing 6 of the electronic apparatus 1.

The antenna coil 302 is divided into two, i.e. one side part 302a1 in which conducting wires 302a are wound around in one direction and other side part 302a2 in which conducting wires 302a are wound around in other direction, via a center line L3 vertically sectioning the opening 302b in a longitudinal direction. In addition, in this embodiment, a magnetic sheet 304 formed by magnetic substance is arranged to be inserted through the opening 302b of the antenna coil 302. In other word, the magnetic sheet 304 is arranged to overlap with at least a part of the antenna coil 302 at opposite side of a surface of the antenna coil 302 opposing to the external apparatus 50. By arranging the magnetic sheet 304, it is possible to improve a communication property of the antenna by collecting and inducing magnetic flux from the external apparatus 50 to a center side of the antenna coil 302.

In this way, in this embodiment, the antenna coil 302 configured in elongated approximately rectangular shape in a longitudinal direction is arranged along the outer edge 38a of the sheet-like electrode section 38 of the touch pad 10. By arranging the elongated approximately rectangular shaped antenna coil 302 along the outer edge 38a of the sheet-like electrode section 38, it is possible to weaken magnetic field strength on the touch pad 10 by reducing magnetic field generated at the antenna coil 302 while communicating with the external apparatus 50 from reaching the touch pad 10.

Therefore, it is possible to inhibit a malfunction of the touch pad 10 occurred by magnetic field generated at the antenna coil 302 reaching the touch pad 10, so it is possible to ensure communication performance of NFC antenna using the magnetic shielding effect of the sheet-like electrode section 38 of the touch pad 10, while maintaining operation performance of the touch pad 10. In other words, it is possible to achieve NFC antenna with good communication efficiency, even the antenna coil 302 is formed in the elongated shape, by using the magnetic shielding effect of the sheet-like electrode section 38, which will be a sensing electrode to which electrode pattern of the touch pad 10 will be formed. The touch pad 10 is used by incorporating it in a portable apparatus such as PC.

Especially, even when the antenna coil 302 is configured such that the conducting wire 302a is wound around in elongated approximately rectangular shape in longitudinal direction, good communication property can be obtained by reducing a deterioration of communication performance of the antenna by mutual cancelling out of induced voltages of the one side part 302a1 and the other side part 302a2 of the antenna coil 302, by using the magnetic shielding effect by the sheet-like electrode section 38 of the touch pad 10. In other word, it is possible to improve communication performance of the antenna, while downsizing the antenna coil 302, and while maintaining operation performance of the touch pad 10.

Figure 8:
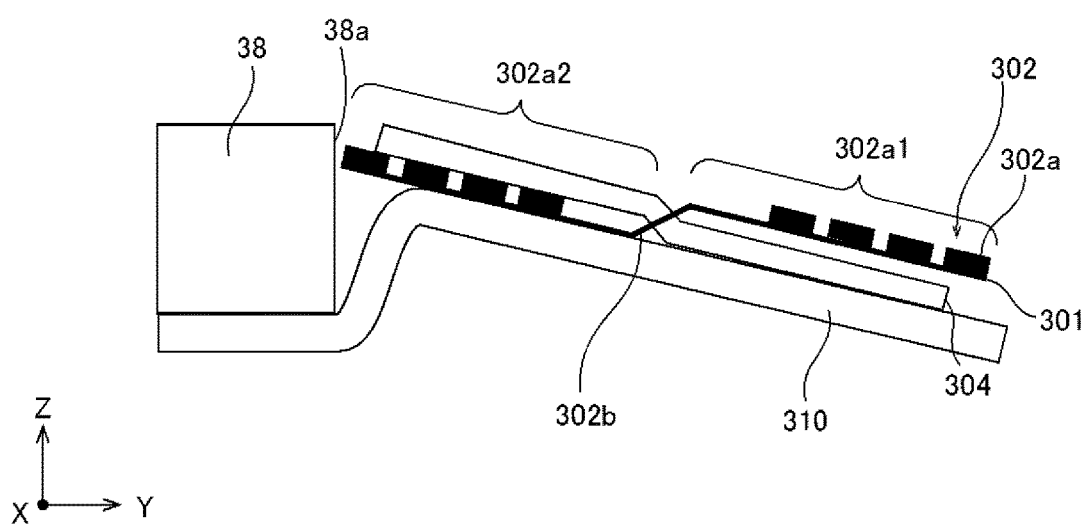
FIG. 8 is a side view illustrating a modified example of the touch pad antenna device relating to third embodiment of the present invention.

In addition, in this embodiment, as well as the first and second embodiments, as illustrated in FIG. 8, a communication property of NFC antenna may be improved by further arranging the conductive sheet 310 consisting of copper, aluminum and else, such that the conductive sheet 310 will be overlapped to both of the antenna coil 302 and the sheet-like electrode section 38. By arranging the conductive sheet 310, it is possible to improve a communication property of the antenna, by using a magnetic field shielding effect by the conductive sheet 310 and a sheet-like electrode section 38 composing the touch pad 10.

EXAMPLES

Next, explaining about examples of verification and evaluation of touch pad antenna device relating to each embodiment of the present invention, using drawings. In addition, the present invention should not be limited by the examples.

At first, explaining about an example indicating verification result of magnetic field strength based on a change of figuration of an antenna coil 102 of a touch pad antenna device relating to a first embodiment of the present invention, using drawings.

Figure 9A:
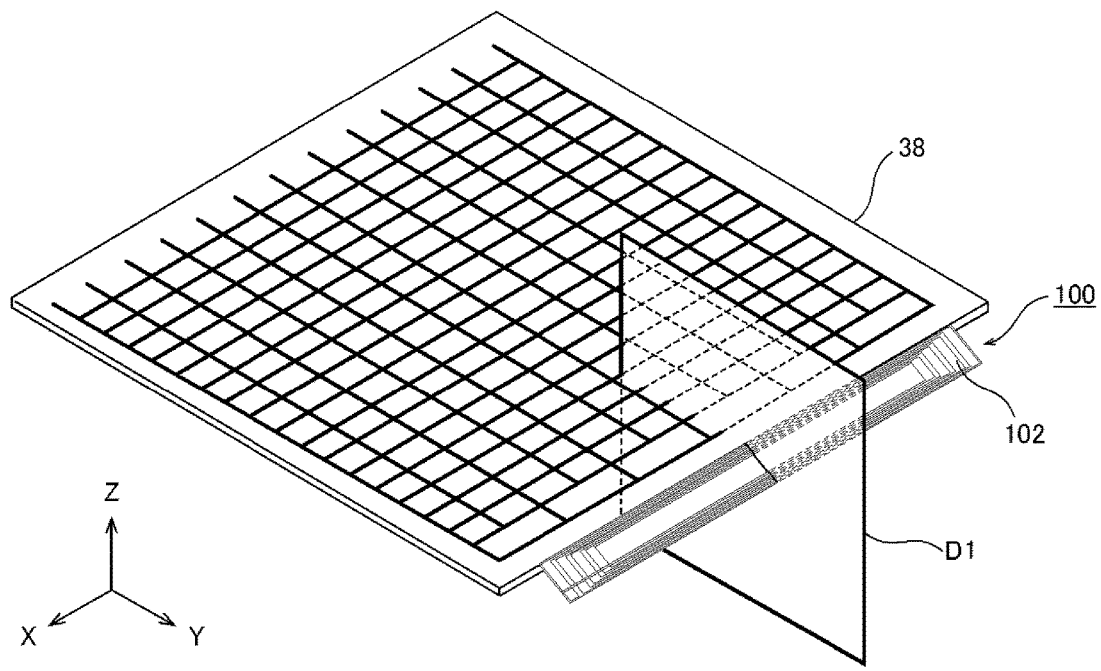
FIG. 9A is a perspective view illustrating a schematic structure of an example of the touch pad antenna device relating to first embodiment of the present invention.
Figure 9B:
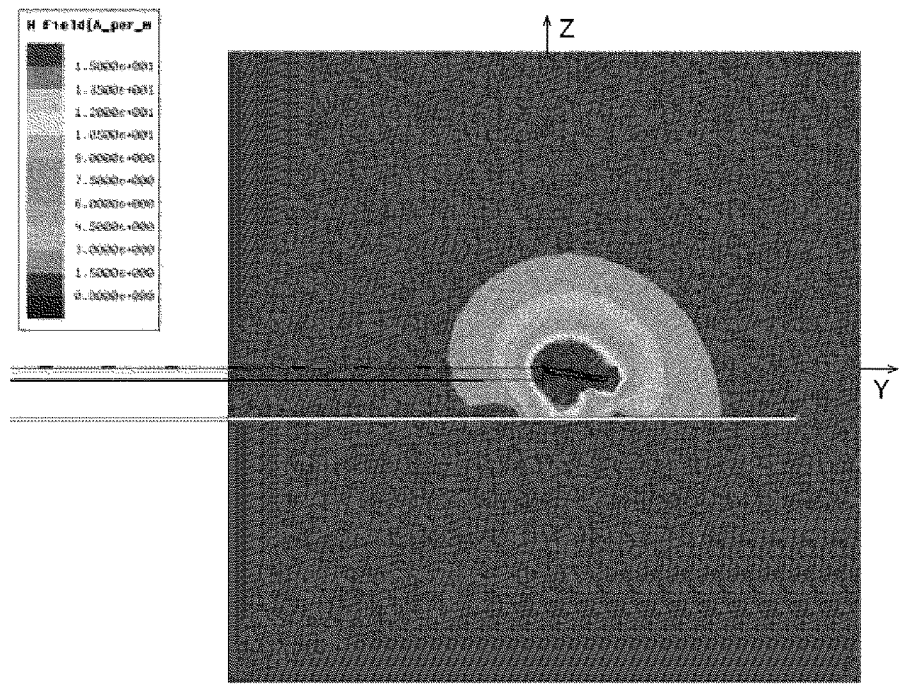
FIG. 9B is a sectional view illustrating magnetic field strength of the touch pad antenna device in the example.
Figure 10A:
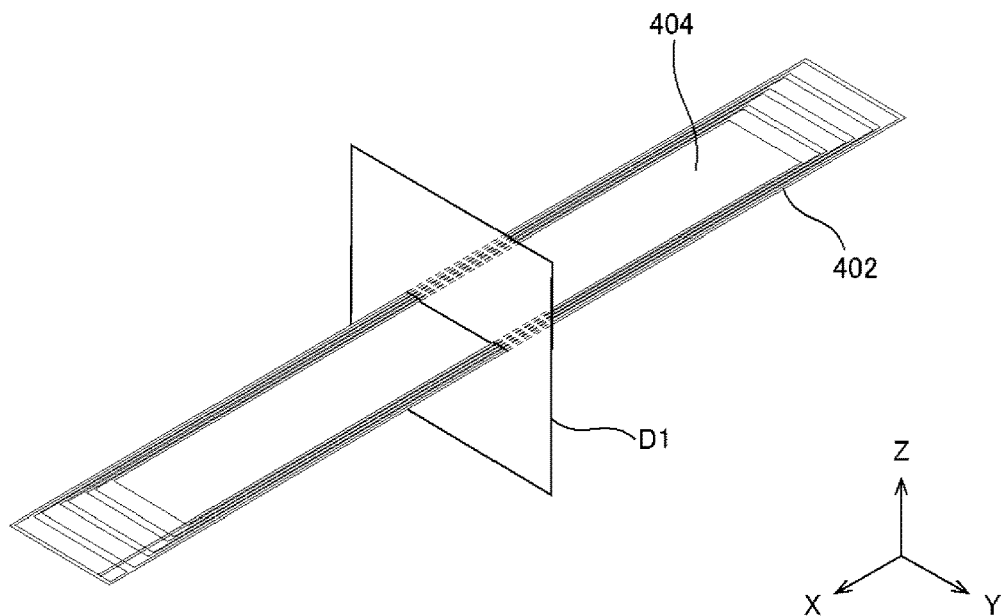
FIG. 10A is a perspective view illustrating a schematic structure of a comparative example 1 of the touch pad antenna device relating to first embodiment of the present invention.
Figure 10B:
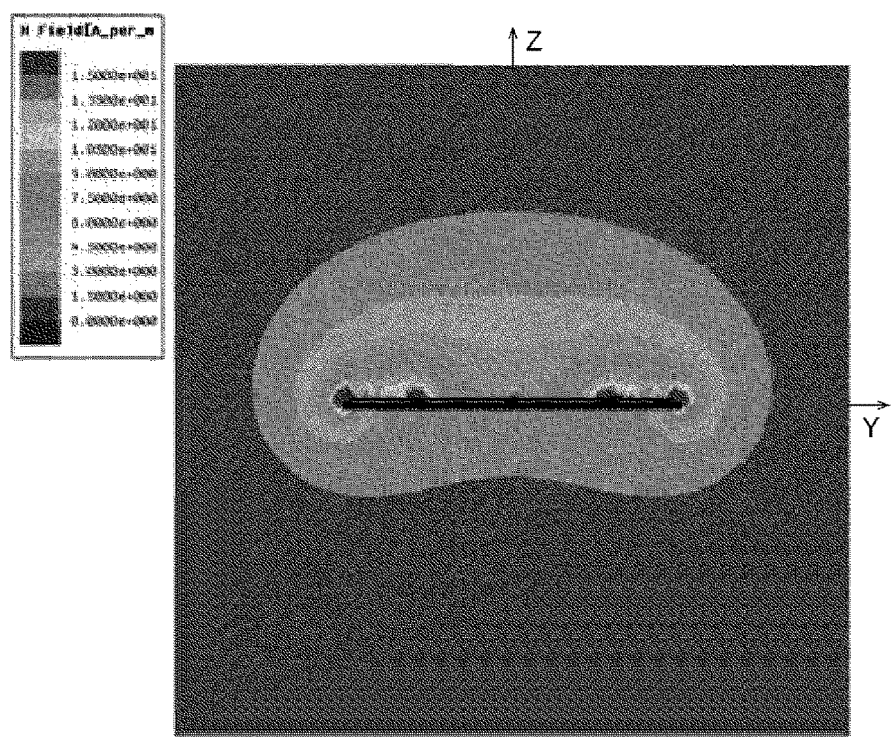
FIG. 10B is a sectional view illustrating magnetic field strength of the touch pad antenna device in the comparative example 1.
Figure 11A:
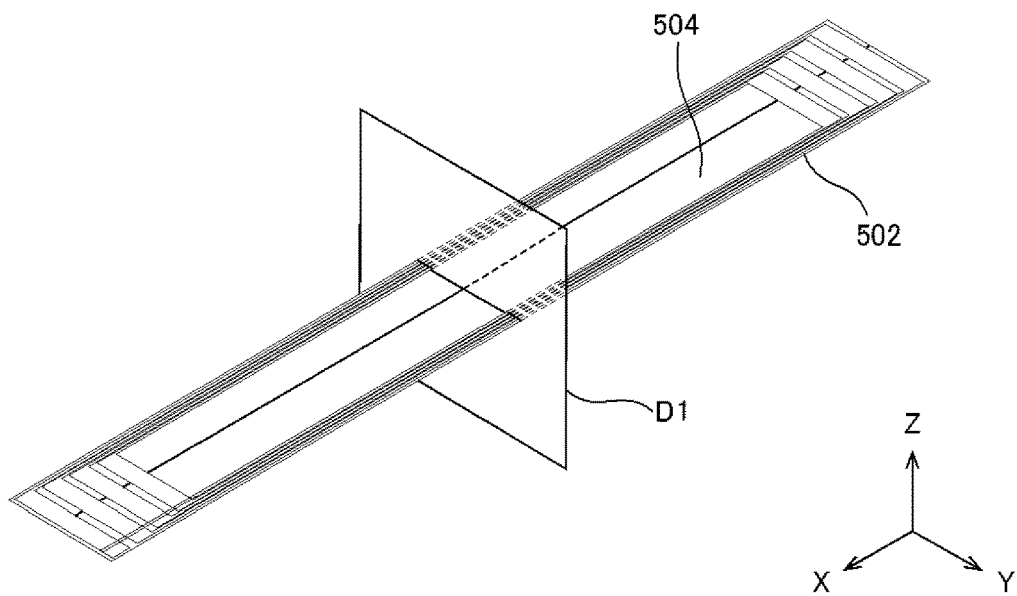
FIG. 11A is a perspective view illustrating a schematic structure of a comparative example 2 of the touch pad antenna device relating to first embodiment of the present invention.
Figure 11B:
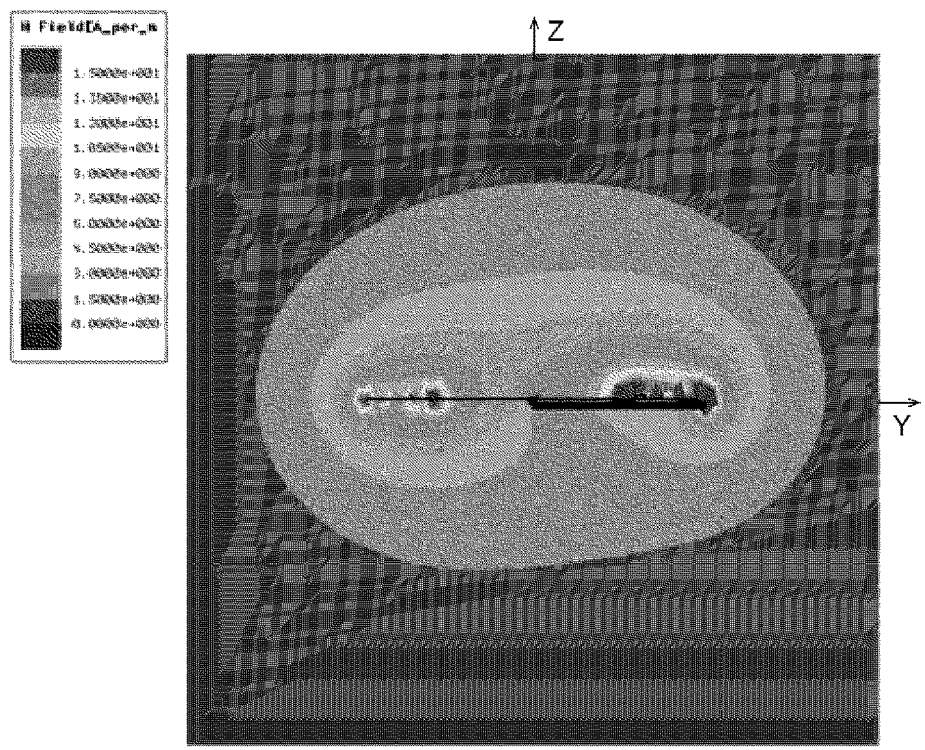
FIG. 11B is a sectional view illustrating magnetic field strength of the touch pad antenna device in the comparative example 2.
Figure 12A:
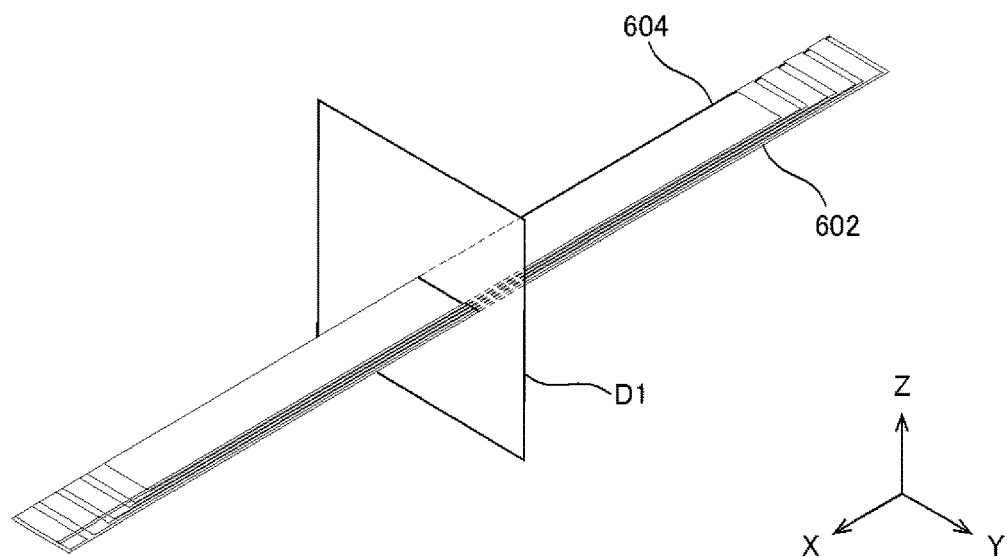
FIG. 12A is a perspective view illustrating a schematic structure of a comparative example 3 of the touch pad antenna device relating to first embodiment of the present invention.
Figure 12B:
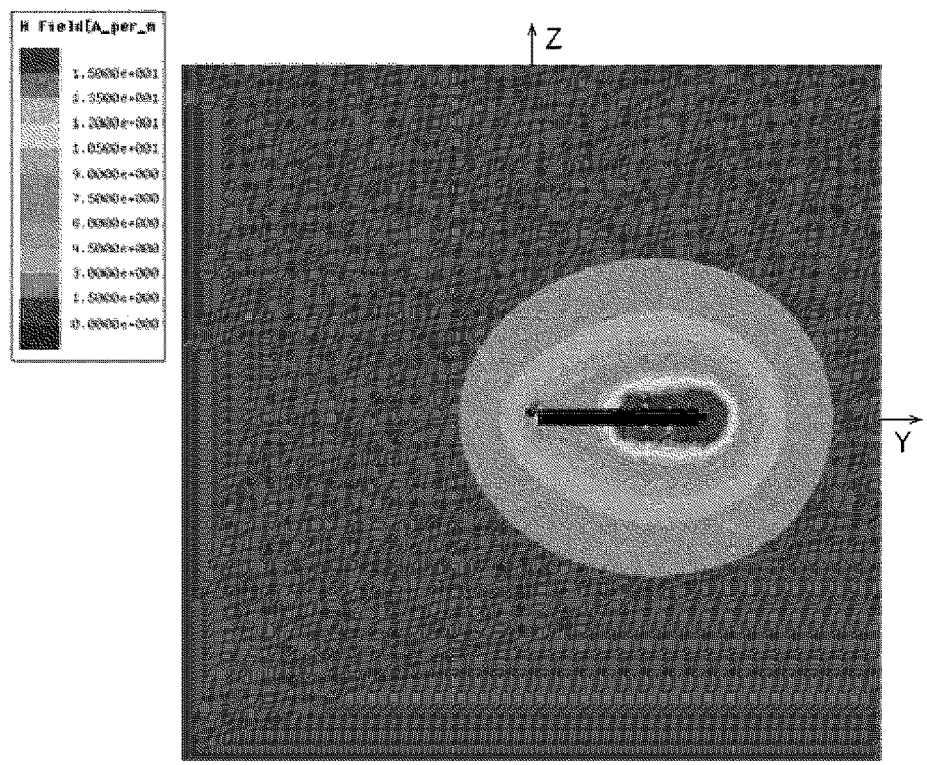
FIG. 12B is a sectional view illustrating magnetic field strength of the touch pad antenna device in the comparative example 3.

FIG. 9A is a perspective view illustrating a schematic structure of an example of the touch pad antenna device relating to the first embodiment of the present invention, and FIG. 9B is a sectional view illustrating magnetic field strength of the touch pad antenna device in the example. In addition, FIG. 10A is a perspective view illustrating a schematic structure of a comparative example 1 of the touch pad antenna device relating to first embodiment of the present invention, and FIG. 10B is a sectional view illustrating magnetic field strength of the touch pad antenna device in the comparative example 1. Further, FIG. 11A is a perspective view illustrating a schematic structure of a comparative example 2 of the touch pad antenna device relating to first embodiment of the present invention, and FIG. 11B is a sectional view illustrating magnetic field strength of the touch pad antenna device in the comparative example 2. In addition, FIG. 12A is a perspective view illustrating a schematic structure of a comparative example 3 of the touch pad antenna device relating to first embodiment of the present invention, and FIG. 12B is a sectional view illustrating magnetic field strength of the touch pad antenna device in the comparative example 3.

At first, we have considered about a distribution of magnetic field strength of an example of touch pad antenna device 100 relating to first embodiment of the present invention. In this example, as illustrated in FIG. 9A, sectional magnetic field strength at a center part of the antenna coil 102 was observed. In addition, in this example, four wound coils in elongated approximately rectangular shape of 80 mm×10 mm extended in a longitudinal direction and folded back at a center line were used, and a thickness of a ferrite sheet under the antenna coil was 0.2 mm. In addition, 1 W of electric power was supplied to a coil terminal, and observation region D1 of sectional magnetic field strength was 20 mm×20 mm.

As illustrated in FIG. 9B, it can be understood that magnetic field strength around the antenna coil 102 was getting weaker compared to magnetic field strength proximate to and just above and below of the antenna coil 102. Especially, it can be understood that magnetic field strength applied to a sheet-like electrode section 38 located at inner side from the antenna coil 102 was getting lower. From the above, it can be understood that magnetic field generated at the antenna coil 102 was not applied to the sheet-like electrode section 38, even if the antenna coil 102 of the touch pad antenna device 100 relating to the first embodiment of the present invention was arranged at outer edge 38a of the sheet-like electrode section 38 of the touch pad 10.

Next, we have verified about a distribution of magnetic field strength of a comparative example 1 of the example of the touch pad antenna device relating to the first embodiment of the present invention. In the comparative example 1, as illustrated in FIG. 10A, sectional magnetic field strength at a center part of the antenna coil 402 was observed. In addition, in the comparative example 1, four wound coils in elongated approximately rectangular shape of 80 mm×10 mm extended in a longitudinal direction were used, and a thickness of a ferrite sheet under the antenna coil was 0.2 mm. In addition, under the antenna coil 402, a magnetic sheet 404 was arranged to overlap with over whole area of the antenna coil 402. Further, 1 W of electric power was supplied to a coil terminal, and observation region D1 of sectional magnetic field strength was 20 mm×20 mm.

As illustrated in FIG. 10B, it can be understood that magnetic field strength in the vicinity of the conducting wire of the antenna coil 402 became stronger, and magnetic field strength became weaker as distance from the antenna coil 402 became larger. Especially, in the comparative example 1, it can be understood that magnetic field strength at above side of the antenna coil 402 became stronger as a whole, as the magnetic sheet 404 was arranged to overlap with over whole surface of the antenna coil 402.

Next, we have verified about a distribution of magnetic field strength of a comparative example 2 of the example of the touch pad antenna device relating to the first embodiment of the present invention. In the comparative example 2, as illustrated in FIG. 11A, sectional magnetic field strength at a center part of the antenna coil 502 was observed. In addition, in the comparative example 2, four wound coils in elongated approximately rectangular shape of 80 mm×10 mm extended in a longitudinal direction were used, and a thickness of a ferrite sheet under the antenna coil was 0.2 mm. In addition, under the antenna coil 502, a magnetic sheet 504 was arranged to overlap with only one side part of the antenna coil 502. Further, 1 W of electric power was supplied to a coil terminal, and observation region D1 of sectional magnetic field strength was 20 mm×20 mm.

As illustrated in FIG. 11B, it can be understood that magnetic field strength of the antenna coil 502 at side of the one side part overlapped with the magnetic sheet 504 became stronger, and magnetic field strength of the antenna coil 502 at side of other side part not overlapped with the magnetic sheet 504 became weaker. In other word, from verification result of the comparative example 2, it can be understood that it was possible to make magnetic field strength generated at the antenna coil 502 stronger only at side of the one side part, by arranging the magnetic sheet 504 to overlap with only the one side part of the antenna coil 502.

Next, we have verified about a distribution of magnetic field strength of a comparative example 3 of the example of the touch pad antenna device relating to the first embodiment of the present invention. In the comparative example 3, as illustrated in FIG. 12A, sectional magnetic field strength at a center part of the antenna coil 602 was observed. In addition, in the comparative example 3, four wound coils in elongated approximately rectangular shape of 80 mm×10 mm extended in a longitudinal direction were used, and a thickness of a ferrite sheet under the antenna coil was 0.2 mm. In addition, under the antenna coil 602, a magnetic sheet 604 was arranged to overlap with only one side part of the antenna coil 602, and other side part of the antenna coil 602 was configured to be folded back to under side of the magnetic sheet 604. Further, 1 W of electric power was supplied to a coil terminal, and observation region D1 of sectional magnetic field strength was 20 mm×20 mm.

As illustrated in FIG. 12B, it can be understood that magnetic field strength in the vicinity of the conducting wires of the one side part and the other side part of the antenna coil 602 overlapped to sandwich the magnetic sheet 604 became stronger, and magnetic field strength of a part folding back the antenna coil 602 became weaker. In other words, it can be understood that magnetic field strength at left side from folded back part of the antenna coil 602 illustrated in FIG. 12B became weaker, by folding back the one side part and the other side part of the antenna coil 602 to sandwich the magnetic sheet 604. From the above, it can be understood that magnetic field generated at the antenna coil 602 was not applied to the touch panel by configuring the antenna coil to be folded back at the center line extending in a longitudinal direction to sandwich the magnetic sheet 604 by the one side part and the other side part of the antenna coil 602, and also, by arranging the antenna coil 602 along outer edge of the touch panel such that a part in which the conducting wires of the one side part and the other side part were in parallel was arranged apart from the center line with respect to the touch panel.

Figure 13A:
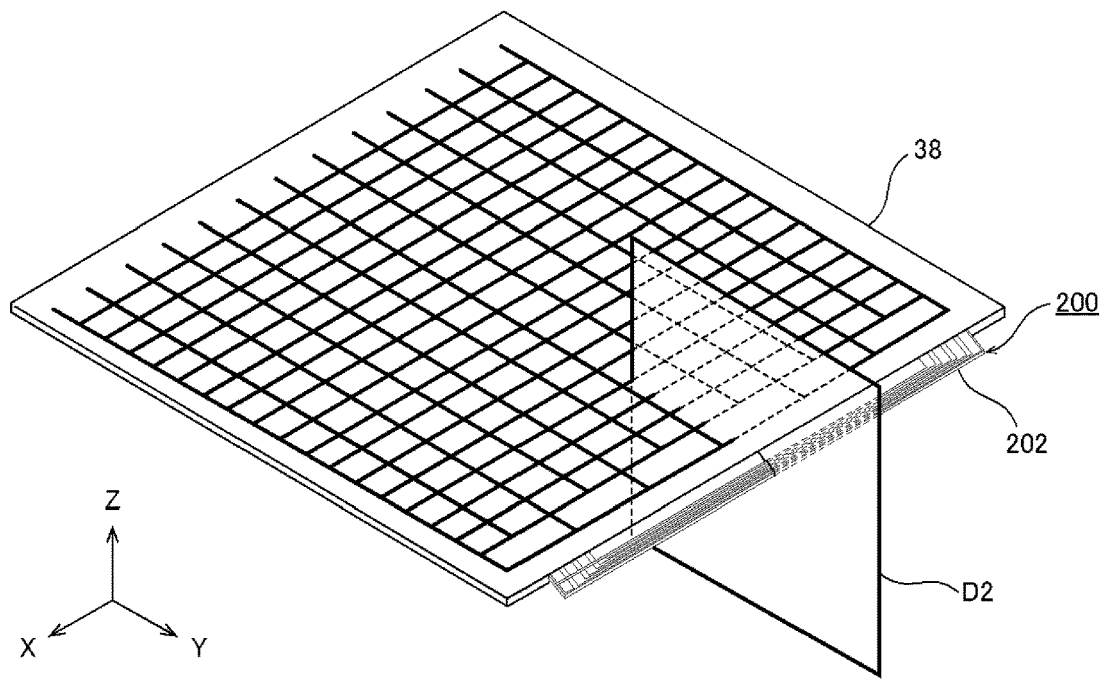
FIG. 13A is a perspective view illustrating a schematic structure of an example of the touch pad antenna device relating to second embodiment of the present invention.

Next, explaining about an example indicating a verification result of magnetic field strength based on a change of figuration of an antenna coil 202 of a touch pad antenna device relating to second embodiment of the present invention, using drawings. FIG. 13A is a perspective view illustrating a schematic structure of an example of the touch pad antenna device relating to second embodiment of the present invention, and FIG. 13B is a sectional view illustrating magnetic field strength of the touch pad antenna device in the example.

In this example, as illustrated in FIG. 13A, sectional magnetic field strength at a center part of the antenna coil 202 was observed. In addition, in this example, four wound coils in elongated approximately rectangular shape of 80 mm×10 mm extended in a longitudinal direction and folded back at a center line were used, and a thickness of a ferrite sheet under the antenna coil was 0.2 mm. In addition, 1 W of electric power was supplied to a coil terminal, and observation region D2 of sectional magnetic field strength was 20 mm×20 mm.

Figure 13B:
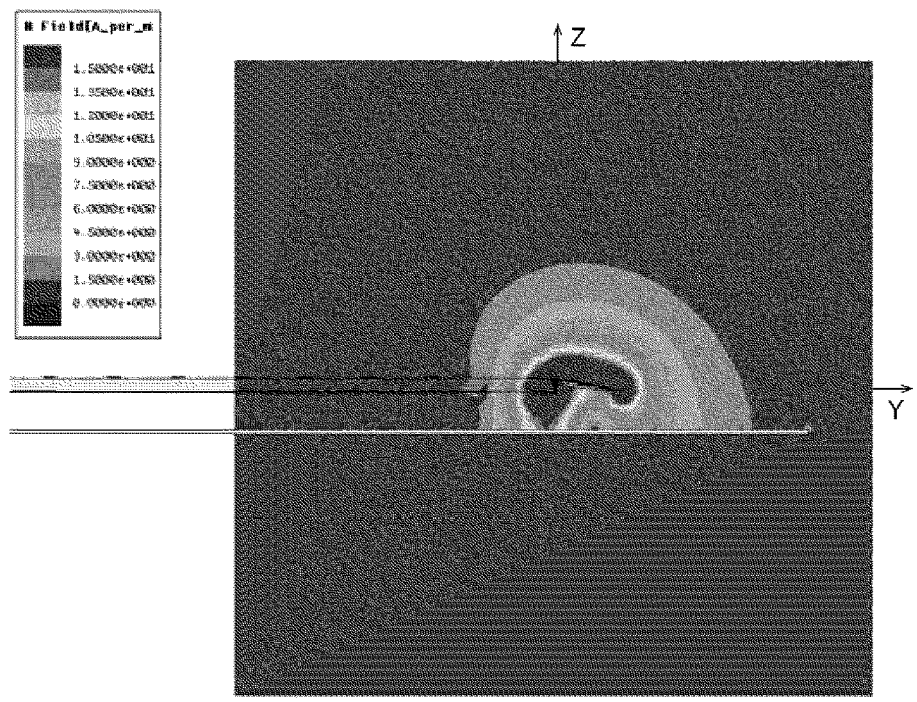
FIG. 13B is a sectional view illustrating magnetic field strength of the touch pad antenna device in the example.

As illustrated in FIG. 13B, it can be understood that magnetic field strength around the antenna coil 202 was getting weaker compared to magnetic field strength proximate to and just above and below of the antenna coil 202. Especially, it can be understood that magnetic field strength applied to a sheet-like electrode section 38 located at inner side from the antenna coil 202 was getting lower. From the above, it can be understood that it is possible to reduce an influence of magnetic field generated at the antenna coil 202 to a touch pad 10, as magnetic field generated at the antenna coil 202 was not applied to the sheet-like electrode section 38, even if the antenna coil 202 of the touch pad antenna device 100 relating to the second embodiment of the present invention was arranged at outer edge 38a of the sheet-like electrode section 38 of the touch pad 10.

Figure 14A:
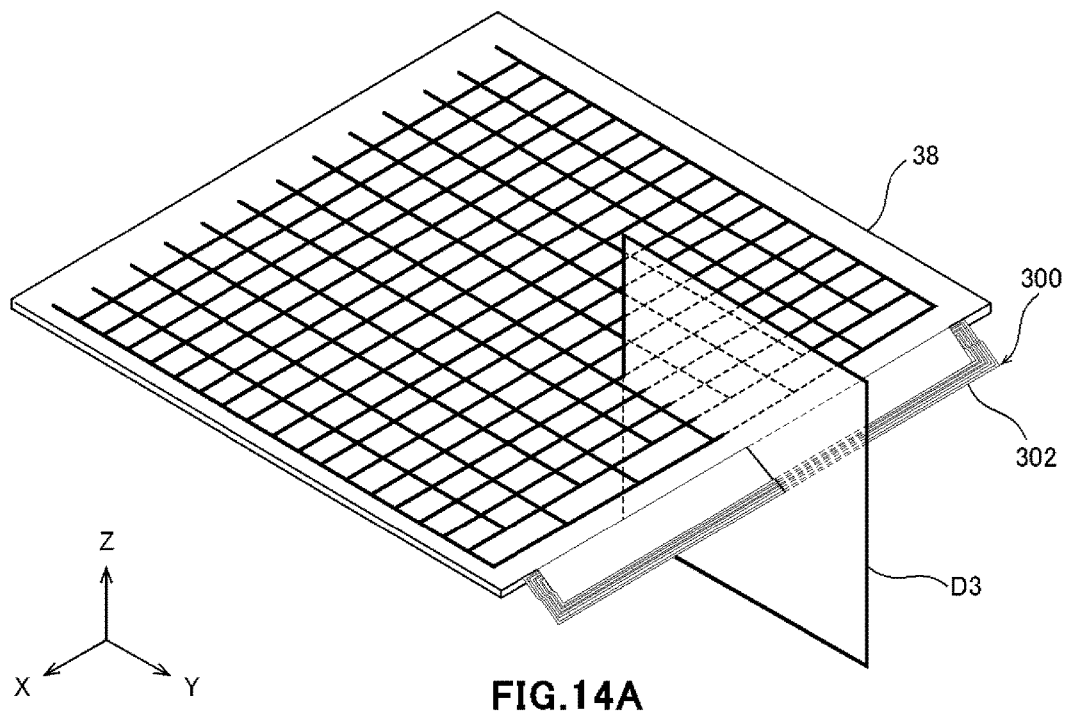
FIG. 14A is a perspective view illustrating a schematic structure of an example of the touch pad antenna device relating to third embodiment of the present invention.

Next, explaining about an example indicating a verification result of magnetic field strength based on a change of figuration of an antenna coil 302 of a touch pad antenna device relating to third embodiment of the present invention, using drawings. FIG. 14A is a perspective view illustrating a schematic structure of an example of the touch pad antenna device relating to third embodiment of the present invention, and FIG. 14B is a sectional view illustrating magnetic field strength of the touch pad antenna device in the example.

In this example, as illustrated in FIG. 14A, sectional magnetic field strength at a center part of the antenna coil 302 was observed. In addition, in this example, four wound coils in elongated approximately rectangular shape of 80 mm×10 mm extended in a longitudinal direction and folded back at a center line were used, and a thickness of a ferrite sheet under the antenna coil was 0.2 mm. In addition, 1 W of electric power was supplied to a coil terminal, and observation region D3 of sectional magnetic field strength was 20 mm×20 mm.

Figure 14B:
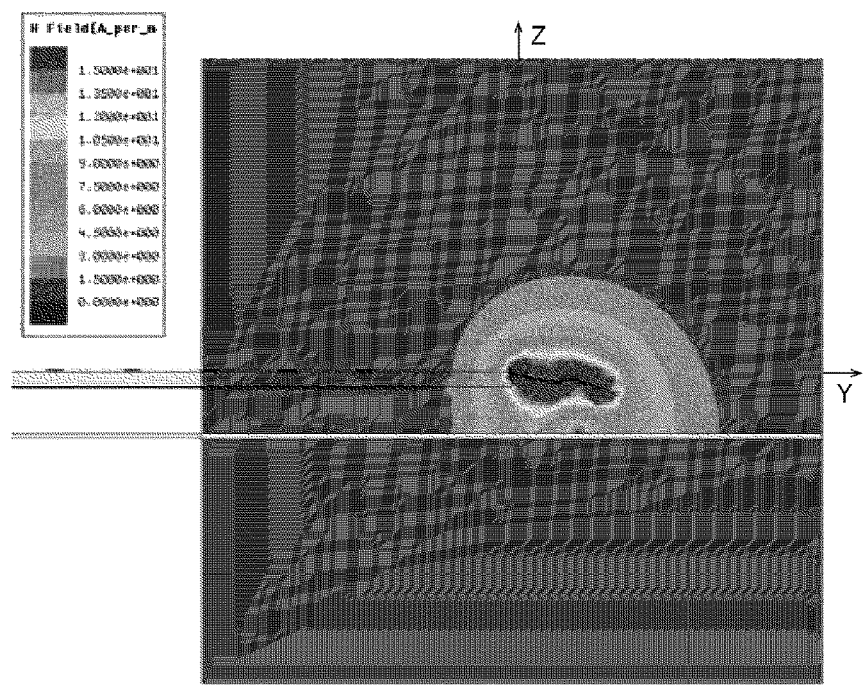
FIG. 14B is a sectional view illustrating magnetic field strength of the touch pad antenna device in the example.

As illustrated in FIG. 14B, it can be understood that magnetic field strength around the antenna coil 302 was getting weaker compared to magnetic field strength proximate to and just above and below of the antenna coil 302. Especially, it can be understood that magnetic field strength applied to a sheet-like electrode section 38 located at inner side from the antenna coil 302 was getting lower. From the above, it can be understood that it is possible to reduce an influence of magnetic field generated at the antenna coil 302 to a touch pad 10, as magnetic field generated at the antenna coil 302 was not applied to the sheet-like electrode section 38, even if the antenna coil 302 of the touch pad antenna device 100 relating to the third embodiment of the present invention was arranged at outer edge 38a of the sheet-like electrode section 38 of the touch pad 10.

In addition, we have explained in detail about each embodiment and each example of the present invention as above, but it would be easy for those who skilled in the art to understand that various modifications are possible without substantively departing from new matters and effect of the present invention. Therefore, all of these modifications should be included in a scope of the present invention.

For example, terms described with different terms having broader or equivalent meaning at least once in description and drawings can be replaced with these different terms in any part of description and drawings. In addition, configuration and operation of the touch pad antenna device and the electronic apparatus are also not limited to those explained in each embodiment and each example of the present invention and it can be performed with various modifications.

Glossary of Drawing References

1 Personal Computer (Electronic Apparatus)
10 Touch Pad (Touch Panel)
12 Face Sheet
34 X Electrode Layer
36 Y Electrode Layer
38 Shield Electrode Layer (Sheet-like Electrode Section)
38a Outer Edge
50 External Apparatus
100, 200, 300 Touch Pad Antenna Device
101, 201, 301 Antenna Substrate
102, 202, 302 Antenna Coil
102a, 202a, 302a Conducting Wire
102a1, 202a1, 302a1 One Side Part
102a2, 202a2, 302a2 Other Side Part
102b, 202b, 302b Opening
104, 204, 304 Magnetic Sheet
110, 210, 310 Conductive Sheet

The invention claimed is:

1. A touch pad antenna device provided along with a capacitance type touch pad mounted on an electronic apparatus and communicates with an external apparatus via an electromagnetic field signal, comprising:
   an antenna coil inductively coupled to the external apparatus and arranged by winding around a conducting wire such that conducting wires opposing in width direction via an opening will be close to each other,
   wherein the antenna coil is arranged along outer edge of a sheet-like electrode section constituting the touch pad,
   wherein the antenna coil is divided into two parts comprising one side part in which conducting wires are wound around in one direction, and other side part in which conducting wires are wound around in other direction, via a center line vertically sectioning the opening in a longitudinal direction, and the antenna coil is configured such that the one side part is visible from the external apparatus and that the other side part is not visible from the external apparatus,
   wherein the antenna coil is folded back at the center line such that the other side part is arranged on a surface at opposite side of a surface of the one side part opposing to the external apparatus, and also, the one side part is configured to be arranged along the outer edge of the sheet-like electrode section.

2. The touch pad antenna device according to claim 1, further comprising a magnetic sheet formed by magnetic substance and arranged to overlap with a part of the antenna coil at opposite side of a surface of the antenna coil opposing to the external apparatus.

3. The touch pad antenna device according to claim 2, further comprising a conductive sheet overlapped with the antenna coil and the sheet-like electrode section.

4. The touch pad antenna device according to claim 1, further comprising a conductive sheet overlapped with the antenna coil and the sheet-like electrode section.

5. An electronic apparatus capable of communicating with the external apparatus via an electromagnetic field signal, wherein the touch pad antenna device according to claim 1 is incorporated in the electronic apparatus.

6. A touch pad antenna device provided along with a capacitance type touch pad mounted on an electronic apparatus and communicates with an external apparatus via an electromagnetic field signal, comprising:
   an antenna coil inductively coupled to the external apparatus and arranged by winding around a conducting wire such that conductivity wires opposing in width direction via an opening will be close to each other,
   wherein the antenna coil is arranged along outer edge of a sheet-like electrode section constituting the touch pad,
   wherein the antenna coil is divided into two parts comprising one side part in which conducting wires are wound around in one direction and other side part in which conducting wires are wound around in other direction, via a center line vertically sectioning the opening in a longitudinal direction, and the antenna coil is configured such that the one side part is visible from the external apparatus and that the other side part is not visible from the external apparatus,
   wherein the antenna coil is configured such that the one side part is arranged along the outer edge of the sheet-like electrode section, and also, the other side part is overlapped with the sheet-like electrode section.

7. The touch pad antenna device according to claim 6, further comprising a magnetic sheet formed by magnetic substance and arranged to overlap with a part of the antenna coil at opposite side of a surface of the antenna coil opposing to the external apparatus.

8. The touch pad antenna device according to claim 7, further comprising a conductive sheet overlapped with the antenna coil and the sheet-like electrode section.

9. The touch pad antenna device according to claim 6, further comprising a conductive sheet overlapped with the antenna coil and the sheet-like electrode section.

10. An electronic apparatus capable of communicating with the external apparatus via an electromagnetic field signal, wherein the touch pad antenna device according to claim 6 is incorporated in the electronic apparatus.

* * * * *